(Specimens.)

J. G. KEARSING.
MANUFACTURE AND ORNAMENTATION OF MEDALLIONS, &c.

No. 317,143. Patented May 5, 1885.

Attest:
John A Ellis
A. L. Moore

Inventor:
John G. Kearsing
By K. C. Newell
his Atty.

UNITED STATES PATENT OFFICE.

JOHN G. KEARSING, OF NEWARK, NEW JERSEY.

MANUFACTURE AND ORNAMENTATION OF MEDALLIONS, &c.

SPECIFICATION forming part of Letters Patent No. 317,143, dated May 5, 1885.

Application filed July 31, 1884. (Specimens.)

*To all whom it may concern:*

Be it known that I, JOHN G. KEARSING, a citizen of the United States, residing at Newark, in the county of Essex and State of New Jersey, have invented certain new and useful Improvements in the Manufacture and Ornamentation of Medallions, Checks, and Similar Articles, of which the following is a specification.

My invention relates to a means and method of ornamenting medallions, checks, circular tablets, and other similar articles made from plastic materials; and the object of my improvement is to apply to the face or faces of such articles designs and lettering in lines to simulate fine engraving, whereby I am enabled to furnish an ornamented check presenting on its face designs, letters, or figures having the appearance of being engraved or printed in colors at a trifling expense. By accomplishing this in an economical manner I am enabled to adapt this class of articles to uses hitherto unknown—as, for instance, as a medium for advertising, in which case medallions bearing suitable arbitrary devices and inscriptions for tradesmen could be supplied at a trifling cost as compared with printing.

Figure 1:
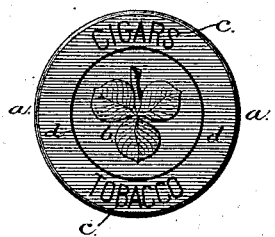
Figure 2:

In the accompanying drawings, which illustrate a medallion made according to my invention, Figure 1 is a face view of the same having its surface ornamented by means of my method, and Fig. 2 is a cross-section of the same.

In carrying out my invention I employ dies or molds of a suitable shape, between which the material is placed while in a plastic condition and solidified by pressure.

In the accompanying drawings, *a* represents a circular tablet having on its face the design *b* and letters and words *c*, with the ring-line *d*. The ornamentation of the surface of the tablet—that is, the design, letters, &c.—is formed by a filling in of some material in a soft or pliable state in the incut lines after the tablet is removed from the mold or die.

In forming the tablet *a* two circular dies or molds are employed similar in shape, and each of which has on its inner surface the design and other characters cut in relief that are to be impressed on the tablet. In this case both sides of the tablet are to be ornamented. If only one side is to receive the impression, of course but one die will have the design cut or engraved on its face. I then place between these dies the plastic material and apply pressure until the article is completed. Upon removing the tablet from the dies the two face surfaces will be ornamented with the design in intaglio, as represented in relief on the dies. After the medallion is removed from the dies it is placed in a chuck, and while being rapidly rotated a stick of wax is applied to its face, which, becoming melted by the friction, will quickly fill up the indented lines of the design on the face of the medallion. The surface is then wiped off to remove any superfluous wax, and the completed medallion is removed from the chuck ready for use. The operation of filling up the lines is almost instantaneous, and the wax sets or hardens as soon as the article is removed, so that clear and distinctly-defined lines, resembling engraved lines, are produced on the face of the medallion.

The tablet represented in the drawings is designed as an advertising-medallion for use among tradesmen, and in general appearance has the effect of fine engraving, while the cost of production is merely nominal as compared with an engraved design.

In the manufacture of checks for use in games—as faro-checks—a high degree of ornamentation can be obtained by my invention with little expense.

In filling up the hollow lines of the design any suitable substance may be employed; but wax has been found to be the most economical and most easy of application.

What I claim as new, and desire to secure by Letters Patent, is—

1. The process of ornamenting medallions with line designs, which consists in producing the design in intaglio by suitable dies, and then filling up such indented lines with melted wax, as set forth.

2. A medallion or circular tablet molded from plastic material, and having its face or faces ornamented with a design in imitation of engraving, substantially as set forth.

3. A medallion or tablet for an advertising device, made of plastic material, and having a design and letters on its face or faces, formed as herein described, to represent line-engraving.

4. The improved method of producing ornamented medallions from plastic material, which consists in subjecting the material to pressure in dies having the design and letters in relief, and then filling up the indented lines of the design and letters in the material with wax of a different color, as and for the purpose set forth.

JOHN G. KEARSING.

Witnesses:
HERMAN G. LOEW,
M. H. WARNER.